Figure 1:
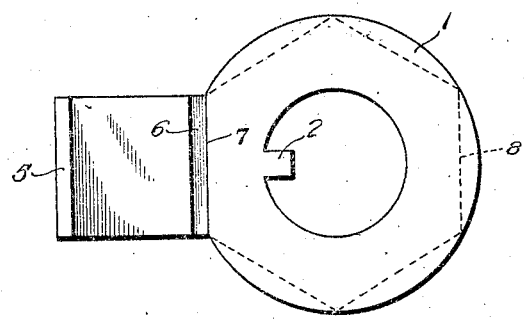

J. A. CRANE.
NUT LOCK.
APPLICATION FILED JAN. 26, 1916.

1,309,463.

Patented July 8, 1919.

Inventor
J. A. Crane,
By Victor J. Evans
Attorney

Witnesses
J H Crawford

UNITED STATES PATENT OFFICE.

JAMES A. CRANE, OF BELFAST, MAINE.

NUT-LOCK.

1,309,463.   Specification of Letters Patent.   Patented July 8, 1919.

Application filed January 28, 1916. Serial No. 74,446.

*To all whom it may concern:*

Be it known that I, JAMES A. CRANE, a citizen of the United States, residing at Belfast, in the county of Waldo and State of Maine, have invented new and useful Improvements in Nut-Locks, of which the following is a specification.

This invention relates to an improvement in nut locks.

In carrying out my invention it is my purpose to simplify and improve the existing art by producing a nut lock formed from a single strip of suitable material and comprising a bolt engaging body having an angularly disposed tongue, the said body at the juncture of the tongue and upon its upper face being formed with a V-shaped groove, the opposite walls of which being arranged at angles of forty-five degrees whereby the tongue may be readily bent upon the body to permit of the angular walls contacting so that the said tongue will assume a positive right angular position with relation to the body.

It is also my purpose to provide a nut lock comprising a body having bolt engaging means and which, during the process of stamping is formed with an angular bendable tongue, said body, at the juncture of the tongue being formed with a groove which serves as a guide upon which the tongue is bent and the gap provided by the groove being sufficient to permit of the nut moving thereover without contacting with the tongue when the said nut is screwed upon the bolt.

With the above and other objects in view, the improvement resides in the construction, combination and arrangement of parts set forth in the following specification and falling within the scope of the appended claim.

Figure 2:
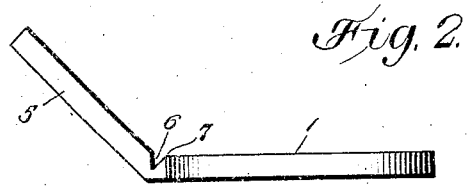
Figures 4, 5:
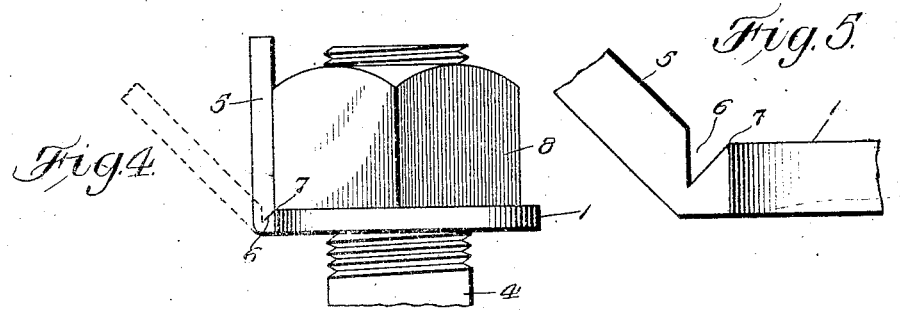
Figure 3:
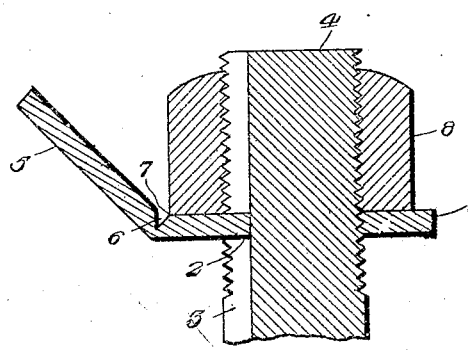

In the drawings:

Figure 1 is a plan view of a nut lock constructed in accordance with the present invention, the nut being indicated by the dotted lines, Fig. 2 is a side elevation of the lock, Fig. 3 is an elevation, partly in section, illustrating the device applied and preparatory to the bending of the tongue against the side of the nut, Fig. 4 is an elevation showing the tongue of the nut lock bent against the nut, and Fig. 5 is an enlarged detail edge view of the nut lock illustrating the angular arrangement of the tongue with respect to the body of said washer.

In producing my nut lock I employ a suitable die arranged to operate upon a strip of comparatively low grade steel, to produce therefrom the flat body portion 1 of the lock, to form the same with a central bolt receiving opening within which extends a lug 2 that is adapted to engage in a longitudinally extending groove 3 in the bolt 4, and to further form the body with a longitudinally extending angularly disposed tongue 5, as well as to form the body at the juncture of the tongue therewith with a substantially V-shaped groove 6 that is disposed angularly of the tongue. The opposite walls of the groove are arranged at angles of forty-five degrees so that when the tongue is bent upon the body the walls of the groove will contact with each other and when in such contact the tongue 5 will be arranged at a right angle with relation to the body. The inner shoulder provided by the groove 6, indicated, for distinction, by the numeral 7, serves as a guide line for one of the edges of the nut 8, as clearly illustrated in Fig. 1 of the drawings, by the dotted lines which indicate the nut.

The angular arrangement of the tongue 5, with relation to the body 1 is such as to not interfere with the free screwing of the nut upon the bolt, the corner of the nut passing over the gap provided by the said groove and the juncture of the tongue 5 with the body, opposite the groove, is angular; that is, the tongue is not rounded from the body. This is permitted by the arrangement of the bed upon which the die works and is desirable inasmuch as the tongue may be readily bent to nut-engaging position without danger of breaking the tongue at its juncture with the body, it being noted that this portion of the lock is of a materially greater thickness than would be the case were the tongue rounded from the body. By reference to Figs. 3 and 4 of the drawings it will be noted that the tongue 5 is of a greater length than the thickness of the nut 8, so that the projecting end of the tongue is in a position to be contacted, as by the blow of a hammer, to bend the same out of engagement with the nut, as indicated by the dotted lines in Fig. 4. This permits of the nut being unscrewed from the bolt without removing or injuring the lock, and the referred to thickened portion at the juncture of the tongue and body permits of the said tongue, as previously referred to, being bent either toward or away from the said nut.

The arrangement of the groove 6 and the particular location thereof are deemed the essential features of the present invention. Were the lock not provided with this groove and the metal employed in its construction of any determined thickness, the same, when bent at a right angle, would necessarily contract upon its inner surface and draw or expand the metal at the outer corner of the bend. This would cause the metal to be piled at the inner corner of the bend, so that an uninterrupted right angular surface between the body and the tongue would not be produced. With metal of a comparatively cheap grade and which embodies a determined amount of brittleness the same cannot be bent at a right angle without breakage. With spring metal the bent portion will at all times have a tendency to spring outward from the nut so that the tongue will not positively engage with the side of the nut upon the entire surface of the said side and in no instance could a positively right angular relation between the tongue and body be assured as is provided for by the contacting angular faces of the groove when my tongue is bent.

It is, of course, to be understood that different washers are provided for various sizes and shapes of nuts, and from the above it is thought that the simplicity and advantages of my structure will be apparent without further detailed description.

Having thus described the invention, what I claim is:

The herein described construction of nut locks formed in the process of manufacture to provide a flat body and a rectangular tongue arranged angularly with respect to the body, said tongue and body, at the juncture therebetween being thickened in the said process of manufacture at the outer corner provided by the juncture of the said tongue and body, the body having a bolt opening provided with an inturned lug, and said lug being arranged approximately central with respect to the tongue, the body and tongue upon the outer face of the device being cut transversely and the walls provided by the cut being angular with respect to each other, whereby when the said tongue is bent toward the body, the said angular walls will contact to retain the tongue at a right angle with respect to the body, and also whereby the thickened corner of the device will effect in preventing the breakage or injury to the tongue when subjected to the impact of force in bending the said tongue toward the body, and the tongue being of a greater length than the thickness of the nut which is adapted to be arranged upon the body.

In testimony whereof I affix my signature in presence of two witnesses.

JAMES A. CRANE.

Witnesses:
MAURICE W. LORD,
ETHEL WILLEY.